US009032386B1

(12) United States Patent
Vaynshteyn et al.

(10) Patent No.: US 9,032,386 B1
(45) Date of Patent: May 12, 2015

(54) PRODUCT UPGRADE LOCATION IDENTIFIER FOR SOFTWARE UPGRADE

(75) Inventors: Igor Vaynshteyn, San Francisco, CA (US); Sakshi Sachdev, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/561,286

(22) Filed: Jul. 30, 2012

(51) Int. Cl.
*G06F 9/455* (2006.01)
*G06F 9/44* (2006.01)
*G06F 9/445* (2006.01)

(52) U.S. Cl.
CPC ... *G06F 8/68* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 7,281,047 | B2 * | 10/2007 | Hayko et al. | 709/229 |
| 7,305,672 | B2 * | 12/2007 | Vincent | 717/172 |
| 7,539,686 | B2 * | 5/2009 | Shepard et al. | 1/1 |
| 7,831,967 | B2 * | 11/2010 | Won et al. | 717/172 |
| 7,856,631 | B2 * | 12/2010 | Brodkorb et al. | 717/177 |
| 7,966,612 | B2 * | 6/2011 | D'Alterio et al. | 717/168 |
| 8,239,852 | B2 * | 8/2012 | Etchegoyen | 717/172 |
| 8,463,884 | B2 * | 6/2013 | Clinton et al. | 709/221 |
| 2003/0046676 | A1 * | 3/2003 | Cheng et al. | 717/173 |
| 2005/0144616 | A1 * | 6/2005 | Hammond et al. | 717/173 |
| 2006/0174242 | A1 * | 8/2006 | Zhu et al. | 717/172 |
| 2009/0254897 | A1 * | 10/2009 | Segalov | 717/173 |
| 2012/0047029 | A1 * | 2/2012 | Veres et al. | 705/14.73 |
| 2012/0110564 | A1 * | 5/2012 | Ran et al. | 717/173 |
| 2013/0042230 | A1 * | 2/2013 | Little et al. | 717/173 |
| 2013/0067449 | A1 * | 3/2013 | Sannidhanam et al. | 717/170 |
| 2013/0311982 | A1 * | 11/2013 | Lal | 717/172 |
| 2013/0332917 | A1 * | 12/2013 | Gaither et al. | 717/170 |

OTHER PUBLICATIONS

Alexander, Alvin, "Create an Executable Jar File by Dynamically Referencing the Jar Files you Depend on," http://www.devdaily.com/java/edu/pj/create-executable-jar-file-reference-dependencies/, Developer's Daily, Java Education, 2009.
Munki, "Managed Software Installation for OS X," http://code.google.com/p/munki/, Google, Aug. 19, 2011.
Suraci, Alex, "Simplified Application Deployment With Cloud Foundry 'Manifest'," http://blog.cloudfoundry.com/post/13481010498/simplified-application-deployment-with-cloud-foundry-manifest, Cloud Foundry—The Industry's open Platform as a Service, Jan. 10, 2012.

* cited by examiner

*Primary Examiner* — Isaac T Tecklu
(74) *Attorney, Agent, or Firm* — Wolf-SBMC (57) ABSTRACT

An update module receives a first manifest file that indicates a product version for a product and indicates a product upgrade indicator if an upgraded product is available for the product version. In addition, the update module requests a second manifest file from a server according to a product upgrade location identifier. The second manifest file is received from the server if the second manifest file is enabled by the server for the product upgrade indicator. Further the update module installs the upgraded product according to a set of data files in the second manifest file.

21 Claims, 6 Drawing Sheets

PRODUCT UPGRADE LOCATION IDENTIFIER FOR SOFTWARE UPGRADE

BACKGROUND

1. Field

This disclosure generally relates to computing devices. More particularly, the disclosure relates to updating code on a computing device.

2. General Background

Software upgrades may be performed through a network. For example, a server may provide an upgraded software version to a client device so that the client device has the upgraded software. However, current configurations send a new deliverable to the client device each time an upgraded software version is available. Further, testing is typically associated with each new deliverable.

SUMMARY

In one aspect of the disclosure, a computer program product is provided. The computer program product includes a computer useable medium having a computer readable program. The computer readable program when executed on a computer causes the computer to receive, with an update module, a first manifest file that indicates a product version for a product and indicates a product upgrade indicator if an upgraded product is available for the product version. In addition, the computer readable program when executed on the computer causes the computer to request, with the update module, a second manifest file from a server according to a product upgrade location identifier. The computer readable program when executed on the computer causes the computer to receive the second manifest file from the server if the second manifest file is enabled by the server for the product upgrade indicator. Further, the computer readable program when executed on the computer causes the computer to install, with the update module, the upgraded product according to a set of data files in the second manifest file.

In another aspect of the disclosure, a process is provided. The process receives, with an update module, a first manifest file that indicates a product version for a product and indicates a product upgrade indicator if an upgraded product is available for the product version. In addition, the process requests, with the update module, the second manifest file from a server according to a product location upgrade identifier. The process also receives the second manifest file from the server if the second manifest file is enabled by the server for the product upgrade indicator. Further the process installs, with the update module, the upgraded product according to a set of data files in the second manifest file.

In yet another aspect of the disclosure, a system is provided. The system includes a processor configured to receive a first manifest file that indicates a product version for a product and indicates a product upgrade indicator if an upgraded product is available for the product version, request a second manifest file from a server according to a product upgrade location identifier, receive the second manifest file from the server if the second manifest file is enabled by the server for the product upgrade indicator, and install the upgraded product according to a set of data files in the second manifest file.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIGS. 2A-2C illustrate examples of tables that may be utilized as part of manifest files.

DETAILED DESCRIPTION

A computer program product, method, apparatus, and system may utilize at least one product location upgrade identifier to allow for dynamic reconfiguration of a user base and a product. A computing device may download a first manifest file from a server. The first manifest file may indicate a product version of the software residing on the computing device and whether or not a product upgrade is available for the software. If product upgrades are available, the first manifest file may indicate various locations from which the various product upgrades may be downloaded.

Although various product upgrades may be available, the server may enable or disable certain product upgrades based upon a product upgrade indicator. For example, a first manifest file may be sent to users that speak both English and French. The first manifest file may then indicate that various upgrades are available, but that a certain upgrade is only available for English speakers and another upgrade is only available for French speakers. The server enables or disables upgrades based upon the product upgrade identifier such as a language. In other words, the software for both English and French speakers may be aware of all of the upgrades. The location having the software upgrade for the English speakers may be enabled only for the computing devices with the English product upgrade indicator. Similarly, the location having the software upgrade for the French speakers may be enabled only for the computing devices with the French product upgrade indicator.

The software upgrade may be installed with a second manifest file that has a set of data files for product upgrade installation. Accordingly, a computing device may request a second manifest file from the server to upgrade to a particular version of a product. The second manifest file for the product version may be downloaded from the location indicated in the first manifest file if the product upgrade identifier is enabled for that product version. For example, a computing device may request a second manifest file from the server corresponding to the English product upgrade identifier if the server has enabled the English product upgrade identifier.

The product location upgrade identifier identifies location of a manifest file that may be downloaded for a product upgrade. An example of a product location upgrade identifier is a URL. Other types of product location upgrade identifiers may be utilized. The example of a URL is utilized herein only as an example.

By mapping product location upgrade identifiers such as URLs corresponding to various manifest files, a server may send particular functionality to a selected subset of users. For example, a server may upgrade English speakers from version 9.0 to version 10.0 of a product, but may only upgrade French speakers from version 9.0 to version 11.0. The URLs may initially be disabled. Further, a subset of the URLs may be subsequently enabled so that particular upgrades may be available to the subset of the plurality of computing devices. As a result, product upgrades may be performed on a selected subset of products with minimal intervention from an internal development team. For example, URLs may be enabled to provide an upgrade for a first version to certain selected users whereas other URLs may be enabled to provide an update for a second version to other selected users. The fast enabling and/or disabling of URLs at a server allows a same manifest file to initially be sent to all users. Accordingly, different manifest files do not have to be configured for different products for different users. If a particular user upgrades a product, the manifest file provides a URL that the update module utilizes to find a new manifest file with the upgraded product. The update module may then download that new manifest file and upgrade the product with the upgrade files in the new manifest file.

Figure 1:
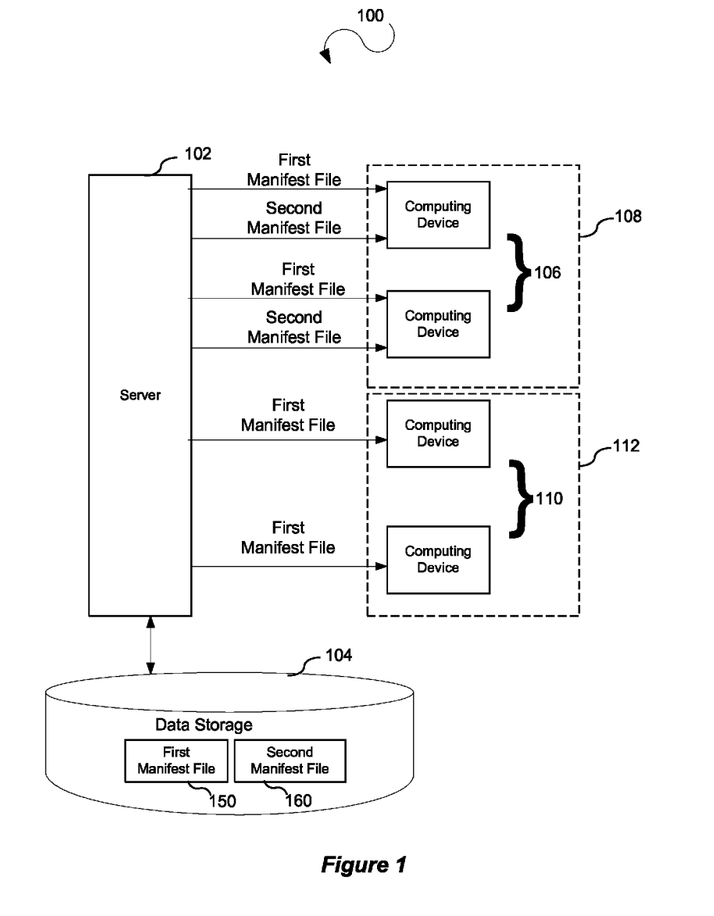
FIG. 1 illustrates a product upgrade location identifier configuration.

FIG. 1 illustrates a product upgrade location identifier configuration 100. A server 102 may operably communicate with a data storage 104. The data storage 104 may be a device such as a memory, hard drive, or the like. The data storage 104 may store a plurality of manifest files such as a first manifest file 150 and a second manifest file 160. For example, the first manifest file 150 may be a manifest file for a version 9.0. As another example, the second manifest file 160 may be a manifest file for a version 10.0. Further, the server 102 may send the first manifest file 150 for the version 9.0 to a first plurality of computing devices 106 corresponding to a first product upgrade identifier 108. The product upgrade identifier may be a language, a geographic region, or the like. For instance, the first product upgrade identifier 108 may be the English language. The server 102 may also send the first manifest file 150 for the version 9.0 to a second plurality of computing devices 110 corresponding to a second product upgrade identifier 112. For instance, the second product upgrade identifier may be the French language.

Further, the server 102 may enable or disable certain product location upgrade identifiers such as URLs in the first manifest file 150 for the version 9.0 based upon the product upgrade identifier. For example, the server 102 may enable an upgrade to product version 10.0 for the first product upgrade identifier 108. Accordingly, the update modules of the plurality of computing devices 106 may be able to receive an upgrade to the product version 10.0. Therefore, the server 102 may send a second manifest file 160 for the version 10.0 to the plurality of computing devices 106. The plurality of computing devices may then utilize a set of data files in the second manifest file 160 to update the plurality of computing devices 106 to the version 10.0. The server may also disable an upgrade to product version 10.0 for the second product upgrade identifier 112. The update modules of the plurality of computing devices 112 may receive the first manifest file 150, but not the second manifest file 160. Since the second product upgrade identifier 112 is disabled by the server 102, the plurality of computing devices 112 cannot receive an upgrade to version 10.0 from the server 102.

Although the second product upgrade identifier 112 is not enabled for an upgrade to product version 10.0, the second product upgrade identifier 112 may be enabled for an upgrade to another product version such as product version 11.0. A different manifest file from the first manifest file 150 and the second manifest file 160 may then be sent from the server 102 to the plurality of computing devices 112 that has a set of data files that the plurality of computing devices 112 may utilize to install the upgrade to version 11.0. Further, the plurality of computing devices 106 may or may not be enabled to receive an upgrade to the product version 11.0. As a result, the server 102 may enable or disable groups of users from downloading particular upgrades.

A computing device may be a personal computer, laptop, notebook, smartphone, cell phone, tablet device, personal digital assistant, kiosk, or the like. Each of the plurality of computing devices 106 may have an update module such as an updater program that may update a currently installed program to a different version of the product, i.e., an upgrade or a downgrade.

Figure 2A:
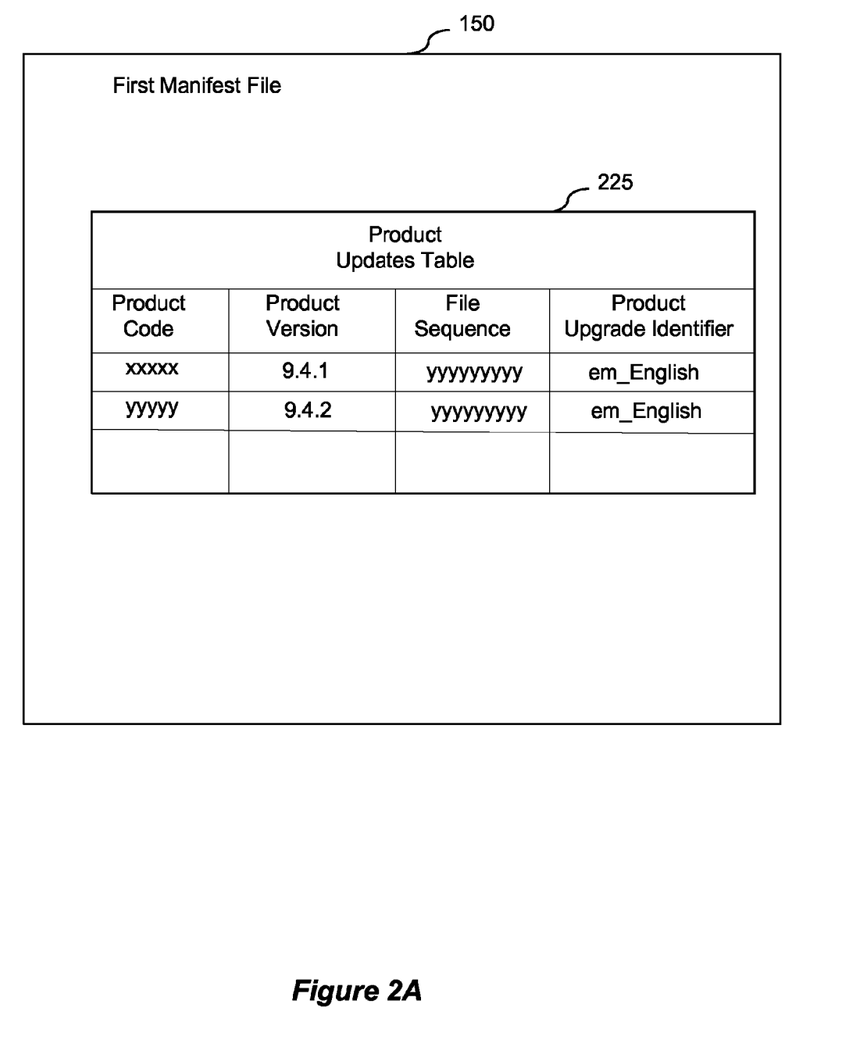
FIG. 2A illustrates the first manifest file for the version 9.0 illustrated in FIG. 1 having a product updates table.
Figure 2B:
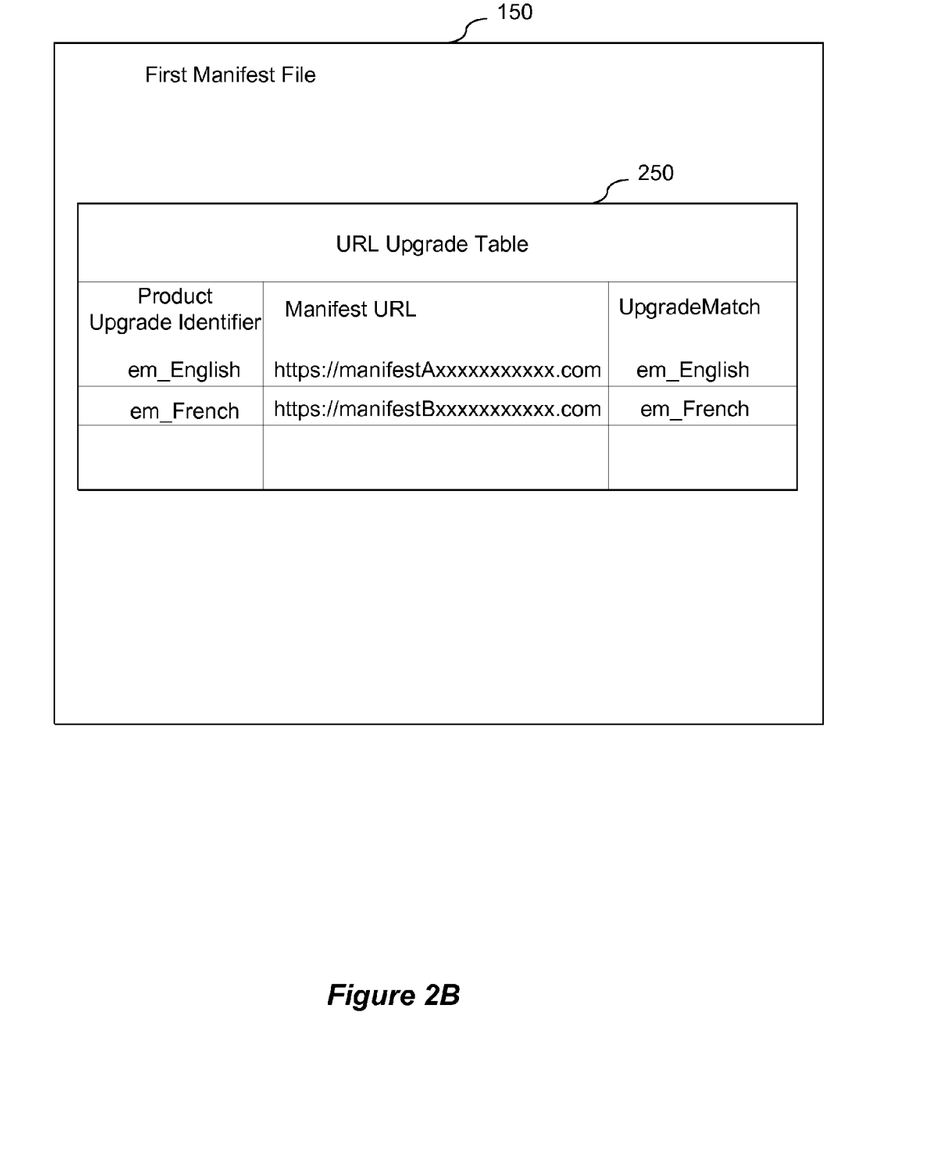
FIG. 2B illustrates the first manifest file for a version 9.0 illustrated in FIG. 1 having a uniform resource locator ("URL") upgrade table.
Figure 2C:
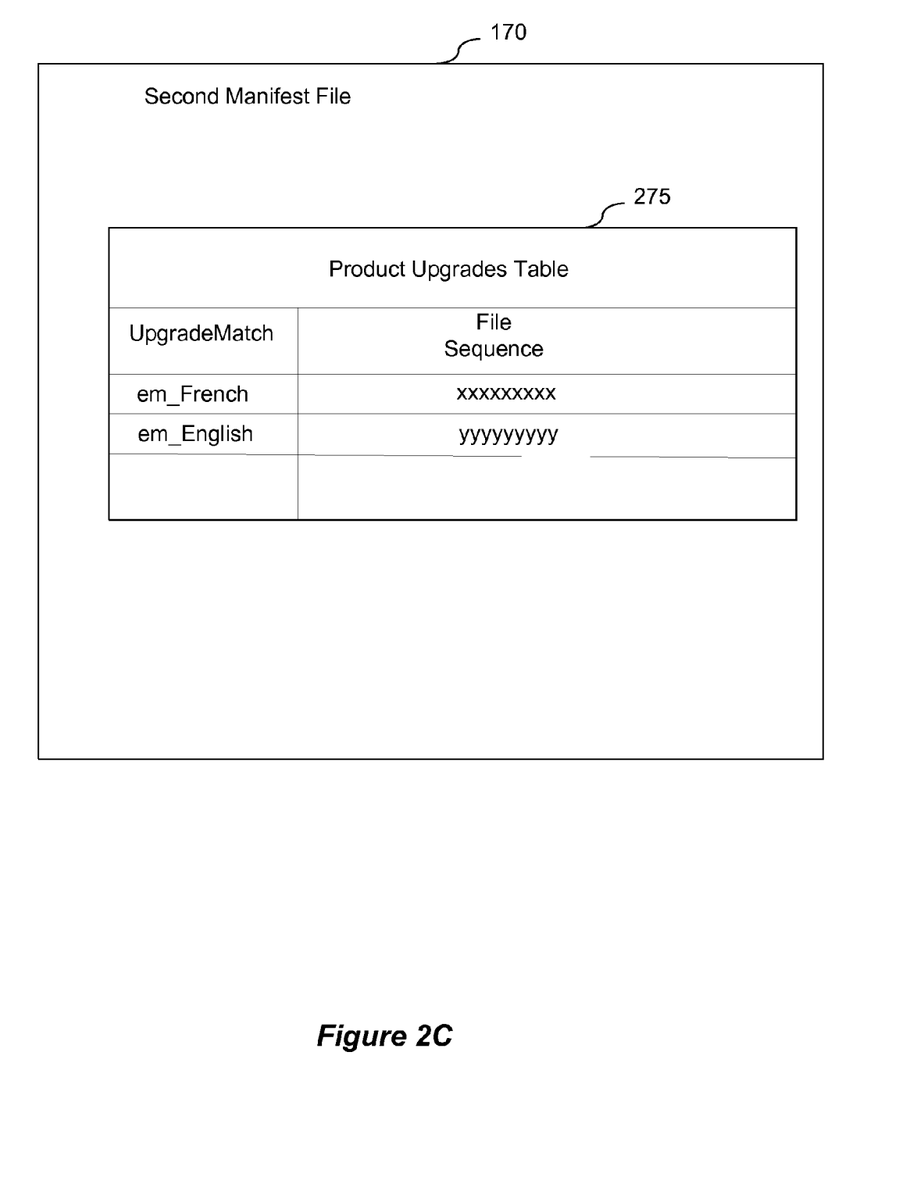
FIG. 2C illustrates the second manifest file for a version 10.0 illustrated in FIG. 1, which has been downloaded as a result of a product upgrade.

In one embodiment, a manifest file may be a table driven database. FIGS. 2A-2C illustrate examples of tables that may be utilized as part of manifest files. FIG. 2A illustrates the first manifest file 150 for the version 9.0 illustrated in FIG. 1 having a product updates table 225. The product updates table 225 may have a product code column, a product version column, a set of data files column, and a product upgrade identifier column. The product upgrade identifier upgrade column may be configured to provide authors with the ability to select a particular product for upgrade. As an example, the product upgrade identifier value of em_English may represent a particular product that may be upgraded for English speakers. The set of data files may be a set of files that is utilized to install the product upgrade.

FIG. 2B illustrates the first manifest file 150 for the version 9.0 illustrated in FIG. 1 having a URL upgrade table 250. The URL upgrade table 250 may have a product upgrade identifier column, a manifest column, and an upgrade match column. The product upgrade identifier column illustrated in FIG. 2A is a key for the URL upgrade table 250. If a product upgrade identifier value in the product upgrade identifier column in the product updates table 225 in FIG. 2A is not established, the corresponding product is not upgradeable. If the product upgrade identifier column value in the upgrade column in the product updates table 225 in FIG. 2A is established, the corresponding product is upgradeable and the product identifier upgrade column in the URL upgrade table 250 is utilized to find a match for a corresponding manifest URL. Different URLs allow a product or a group of products to be enabled or disabled at the server 102 without having to push a new manifest file to all users each time a product is selected for upgrade. Only the users that may receive the upgrade will receive new manifest files. The upgrade match column may be configured to match the product installed on a computing device to the product upgrade identifier found in the manifest file associated with the corresponding URL in the URL upgrade table 250. For example, the first manifest file 150 for version 9.0 may indicate a plurality of different manifest files which are available for download to upgrade the software. For instance, a URL associated with the second manifest file 160 may be associated with the product upgrade identifier em_English. An update module may utilize the URL associated with the product upgrade identifier em_English to attempt to download the second manifest file 160 from the server 102 illustrated in FIG. 1. If the product upgrade identifier is enabled at the server 102, the computing device will be able to receive the second manifest file 160 to upgrade the software to the version 10.0. Further, the first manifest file 150 may indicate other product upgrade identifiers that are associated with other manifest files that are available for download. For example, a manifest file for the product upgrade identifier em_French may be indicated in the first manifest file 150. The server may or may not allow download of that manifest file from a computing device depending on whether or not the product upgrade identifier em_French is enabled by the server for that product upgrade identifier.

Based on the product upgrade match, the update module may download the corresponding manifest file for the em_English product upgrade identifier. FIG. 2C illustrates the second manifest file 160 for version 10.0 illustrated in FIG. 1, which has been downloaded as a result of a product upgrade. The second manifest file 160 for version 10.0 may have a product upgrades table 275. The product upgrades table 275 belongs to the second manifest file 160 for version 10.0 downloaded utilizing a URL from the URL upgrade table 250. An updater may utilize the upgrade match column in the product upgrades table 275 to find the corresponding files to install the upgrade. The set of data files may indicate the set of files that is utilized to install the upgrade.

Alternatively, a manifest file for version 11.0 may have been downloaded for French speakers. The versions provided for herein are utilized only as examples. Various other versions may be utilized. Further, the product upgrade identifiers provided for herein are utilized only as examples. A variety of indicia may be utilized as product upgrade identifiers.

Figure 3:
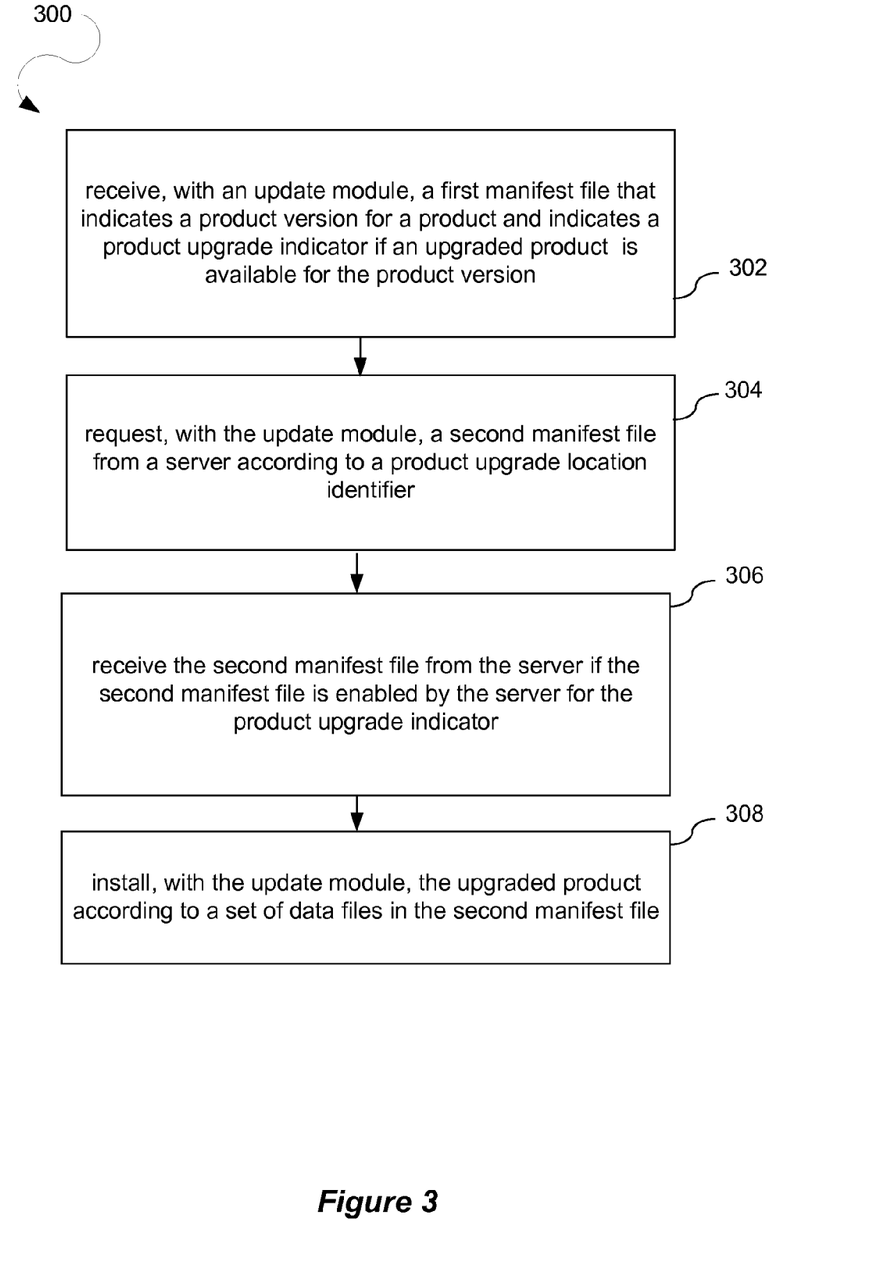
FIG. 3 illustrates a process that may be utilized to provide a product upgrade.

FIG. 3 illustrates a process 300 that may be utilized to provide a product upgrade. At a process block 302, the process 300 receives, with an update module, a first manifest file that indicates a product version for a product and indicates a product upgrade indicator if an upgraded product is available for the product version. In addition, at a process block 304, the process 300 requests, with the update module, a second manifest file from a server according to a product upgrade location identifier. At a process block 306, the process 300 also receives the second manifest file from the server if the second manifest file is enabled by the server for the product upgrade indicator. Further, at a process block 308, the process 300 installs, with the update module, the upgraded product with a set of data files in the second manifest file.

Figure 4:
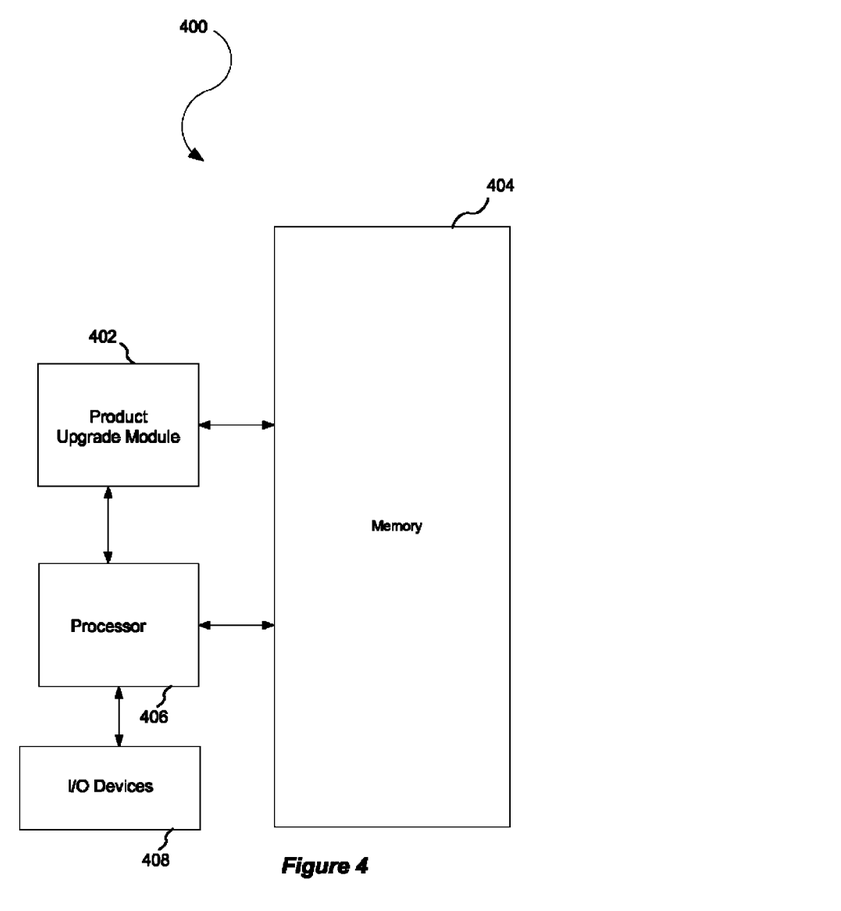
FIG. 4 illustrates a system configuration that may be utilized to provide a product upgrade.

FIG. 4 illustrates a system configuration 400 that may be utilized to provide a product upgrade. In one embodiment, a product upgrade module 402 interacts with a memory 404 and a processor 406. In one embodiment, the system configuration 400 is suitable for storing and/or executing program code and is implemented using a general purpose computer or any other hardware equivalents. The processor 406 is coupled, either directly or indirectly, to the memory 404 through a system bus. The memory 404 may include local memory employed during actual execution of the program code, bulk storage, and/or cache memories which provide temporary storage of at least some program code in order to reduce the number of times code must be retrieved from bulk storage during execution.

The Input/Output ("I/O") devices 408 may be coupled directly to the system configuration 400 or through intervening input/output controllers. Further, the I/O devices 408 may include a keyboard, a keypad, a mouse, a microphone for capturing speech commands, a pointing device, and other user input devices that will be recognized by one of ordinary skill in the art. Further, the I/O devices 408 may include output devices such as a printer, display screen, or the like. Further, the I/O devices 408 may include a receiver, transmitter, speaker, display, image capture sensor, biometric sensor, etc. In addition, the I/O devices 408 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 400 to enable the system configuration 400 to become coupled to other systems, remote printers, or storage devices through intervening private or public networks. Modems, cable modems, and Ethernet cards are just a few of the currently available types of network adapters.

In another embodiment, any of the configurations provided for herein may be utilized for a pilot project to enable or disable features. The pilot project may or may not involve software upgrades. For example, an experiment may be performed to determine how a relatively small set of users react to a particular feature that is enabled or disabled.

Although the examples provided for herein are utilized for product upgrade, the configurations provided for herein may also be utilized for product downgrades. Accordingly, a product downgrade identifier may be utilized.

The processes described herein may be implemented in a general, multi-purpose or single purpose processor. Such a processor will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created utilizing source code or any other known computer-aided design tool. A computer readable medium may be any medium capable of carrying those instructions and include a CD-ROM, DVD, magnetic or other optical disc, tape, silicon memory (e.g., removable, non-removable, volatile, or non-volatile), packetized or non-packetized data through a wireline or wireless transmissions locally or remotely through a network. A computer is herein intended to include any device that has a general, multi-purpose or single purpose processor as described above.

It should be understood that the computer program products, processes, apparatuses, and systems described herein can take the form of entirely hardware embodiments, entirely software embodiments, or embodiments containing both hardware and software elements. If software is utilized to implement the method or system, the software may include but is not limited to firmware, resident software, microcode, etc.

It is understood that the computer program products, processes, apparatuses, and systems described herein may also be applied in other types of computer program products, processes, apparatuses, and systems. Those skilled in the art will appreciate that the various adaptations and modifications of the embodiments of the computer program products, processes, apparatuses, and systems described herein may be configured without departing from the scope and spirit of the present computer program products, processes, apparatuses, and systems. Therefore, it is to be understood that, within the scope of the appended claims, the present computer program products, processes, apparatuses, and systems may be practiced other than as specifically described herein.

We claim:

1. A computer program product comprising a computer useable storage medium having a computer readable program, the computer readable program when executed on a computer system causes the computer to perform operations comprising:

receiving, by the computer system, with an update module, a first manifest file including a set of data files, the first manifest file indicating:

a product version for a product installed on the computer system;

a product upgrade indicator if a product upgrade is available for the product version;

one or more disabled product upgrade indicators corresponding to one or more product upgrades not available for the product version; and a product upgrade location identifier indicating a location of a second manifest file that may be downloaded for the product upgrade if the product upgrade is available for the product version;

requesting, by the computer system, with the update module, the second manifest file from a server according to the product upgrade location identifier;

receiving, at the computer system, the second manifest file from the server if the second manifest file is enabled by the server for the product upgrade indicator;

installing, at the computer system, with the update module, the upgraded product according to a set of data files in the second manifest file;

receiving, by the computer system, an indication from the server that one of the one or more disabled product upgrade indicators corresponding to one or more product upgrades included in the first manifest file is available for the product version;

identifying, by the computer system, with the update module and from the first manifest file, a product upgrade location identifier corresponding to the disabled product indicator indicated as available by the server;

requesting, by the computer system, a third manifest file from a server according to the product upgrade location identifier corresponding to the disabled product indicator indicated as available by the server; and receiving, at the computer system, the third manifest file.

2. The computer program product of claim 1, wherein the product upgrade indicator indicates a language.

3. The computer program product of claim 1, wherein the product upgrade indicator indicates a geographic region.

4. The computer program product of claim 1, wherein the first manifest file is a table driven database.

5. The computer program product of claim 4, wherein the table driven database includes an upgrade column that includes the product upgrade indicator and the one or more disabled product indicators.

6. The computer program product of claim 4, wherein the table driven database includes a product upgrade location identifier column that indicates the product upgrade location identifier and the product upgrade location identifier corresponding to the disabled product indicator indicated as available by the server.

7. The computer program product of claim 4, wherein the table driven database includes an upgrade match column that matches the product installed on the computer system to the product upgrade found in the first manifest file.

8. A method comprising:

receiving, by a computing system with an update module, a first manifest file including a set of data files, the first manifest file indicating:

a product version for a product installed on the computing system;

a product upgrade indicator if product upgrade is available for the product version;

one or more disabled product upgrade indicators corresponding to one or more product upgrades not available for the product version; and a product upgrade location identifier indicating one or more locations of a second manifest file that may be downloaded for a product upgrade if the product upgrade is available for the product version;

requesting, with the update module of the computing system, the second manifest file from a server according to the product upgrade location identifier;

receiving, by the computing system, the second manifest file from the server if the second manifest file is enabled by the server for the product upgrade indicator;

installing, with the update module of the computing system, the product upgrade according to a set of data files in the second manifest file; and receiving, by the computing system, an indication from the server that one of the one or more disabled product upgrade indicators corresponding to one or more product upgrades included in the first manifest file is available for the product version;

identifying, by the update module of the computing system and from the first manifest file, a product upgrade location identifier corresponding to the disabled product indicator indicated as available by the server;

requesting, with the update module of the computing system, a third manifest file from a server according to the product upgrade location identifier corresponding to the disabled product indicator indicated as available by the server; and receiving, at the computing system, the third manifest file.

9. The method of claim 8, wherein the product upgrade indicator indicates a language.

10. The method of claim 8, wherein the product upgrade indicator indicates a geographic region.

11. The method of claim 8, wherein the first manifest file is a table driven database.

12. The method of claim 11, wherein the table driven database includes an upgrade column that includes the product upgrade indicator and the one or more disabled product indicators.

13. The method of claim 11, wherein the table driven database includes a product upgrade location identifier column that indicates the product upgrade location identifier and the product upgrade location identifier corresponding to the disabled product indicator indicated as available by the server.

14. The method of claim 13, wherein the table driven database includes an upgrade match column that matches the product installed on the computing system to the product upgrade found in the first manifest file.

15. A system comprising one or more processors configured to perform operations comprising:

receiving a first manifest file including a set of data files, the first manifest file indicating:

a product version for a product;

a product upgrade indicator if a product upgrade is available for the product version;

one or more disabled product upgrade indicators corresponding to one or more product upgrades not available for the product version; and a product upgrade location identifier indicating a location of a second manifest file that may be downloaded for the product upgrade if the product upgrade is available for the product version;

requesting the second manifest file from a server according to the product upgrade location identifier;

receiving a second manifest file from the server if the second manifest file is enabled by the server for the product upgrade indicator;

installing the product upgrade according to a set of data files in the second manifest file;

receiving an indication from the server that one of the one or more disabled product upgrade indicators corresponding to one or more product upgrades included in the first manifest file is available for the product version;

identifying, from the first manifest file, a product upgrade location identifier corresponding to the disabled product indicator indicated as available by the server;

requesting a third manifest file from a server according to the product upgrade location identifier corresponding to the disabled product indicator indicated as available by the server; and receiving, at the computer system, the third manifest file.

16. The system of claim 15, wherein the product upgrade indicator indicates a language.

17. The system of claim 15, wherein the product upgrade indicator indicates a geographic region.

18. The system of claim 15, wherein the first manifest file is a table driven database that includes an upgrade column that indicates if a product is upgradeable.

19. The system of claim 18, wherein the table driven database includes an upgrade column that includes the product upgrade indicator and the one or more disabled product indicators.

20. The system of claim 18, wherein the table driven database includes a product upgrade location identifier column that indicates the product upgrade location identifier and the product upgrade location identifier corresponding to the disabled product indicator indicated as available by the server.

21. The system of claim 18, wherein the table driven database includes an upgrade match column that matches the product installed on a computing device to the product upgrade found in the first manifest file.

* * * * *